Figure 1:
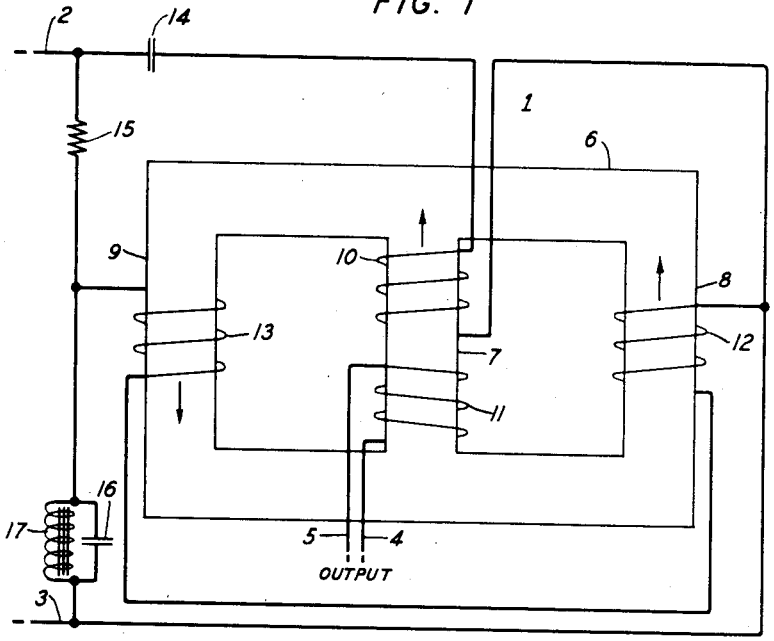

Sept. 29, 1942.  B. E. STEVENS  2,297,673
VOLTAGE REGULATOR
Filed Aug. 31, 1940

INVENTOR
B. E. STEVENS
BY Wayne B Wells
ATTORNEY

Patented Sept. 29, 1942

2,297,673

UNITED STATES PATENT OFFICE 2,297,673

VOLTAGE REGULATOR

Bruce E. Stevens, Kew Gardens, N. Y., assignor to Bell Telephone Laboratories, Incorporated, New York, N. Y., a corporation of New York Application August 31, 1940, Serial No. 354,999

24 Claims. (Cl. 171—119)

This invention relates to regulators and particularly to regulators for governing the voltage on alternating current circuits.

One object of the invention is to provide an alternating current voltage regulator that shall prevent change in the regulated voltage by reason of frequency changes in the source connected to the regulator and temperature changes.

Another object of the invention is to provide a voltage regulator employing the ferro-resonance phenomenon that shall compensate the regulating operation according to frequency and temperature changes.

Another object of the invention is to provide a voltage regulator between an alternating current supply circuit and a load circuit with a ferro-resonance circuit connected across the supply circuit and including the primary winding of a transformer mounted on a three-legged core and having a secondary winding connected to the load circuit and a compensating circuit connected across said supply circuit and having two compensating windings mounted on the core that shall position the transformer windings and the compensating windings on the three legs of the core in a manner to maintain the primary winding flux constant.

A further object of the invention is to provide a voltage regulator of the above-indicated character that shall control the compensating windings in a manner to compensate for frequency changes of the supply circuit and temperature changes.

In many circuits it is desirable to maintain the voltage of an alternating current circuit constant by a regulator which is substantially free from any maintenance costs. It is desirable in many instances to maintain the voltage on a load circuit constant irrespective of the frequency or voltage changes of the source of supply and temperature changes.

In a regulator constructed in accordance with the invention the voltage on a load circuit is maintained constant irrespective of the voltage changes on the supply circuit or changes in load without the use of any moving parts. Moreover the load circuit voltage is maintained constant irrespective of frequency changes of the source which may be instantaneous as when the supply circuit is subjected to lightning discharges. Furthermore, the load circuit voltage is maintained constant irrespective of temperature changes.

According to one form of the invention a ferro-resonance circuit comprising a condenser and the primary winding of a transformer is connected across an alternating current supply circuit. The primary winding and the secondary winding of the transformer are mounted on the central leg of a three-legged core with the secondary winding connected to the load circuit. A compensating circuit comprising a resistance element and two compensating windings is connected across the supply circuit with the two windings respectively mounted on the two outside legs of the core. The compensating circuit cooperates with the ferro-resonance circuit to maintain constant voltage on the load circuit irrespective of voltage changes on the supply circuit. A frequency temperature compensating circuit comprising an iron cored retard coil shunted by a condenser is connected across the two compensating windings.

The ferro-resonance circuit is operated above the jumping point of the characteristic curve and the three-legged core is operated above the knee of the magnetization curve. The two compensating windings respectively mounted on the two outside legs of the core are in series aiding relation. If the voltage on the supply circuit tends to increase, then it is apparent that by reason of the core being saturated a smaller change than the change in supply voltage is produced in the flux of the primary winding. Moreover, in a ferro-resonance circuit the reactance of the condenser is larger than the reactance of the primary winding so that an increase in the supply circuit voltage increases the current through the primary winding of the transformer. This reduces the reactance of the primary winding and the total impedance of the ferro-resonance circuit is increased. The total impedance of the ferro-resonance circuit is essentially the condenser reactance less the primary winding reactance. The total change of flux by the primary winding in the ferro-resonance circuit is much less than the change of voltage on the source, first by reason of the flux change being reduced on account of the core being saturated, and second by reason of the increased impedance in the ferro-resonance circuit.

Although the effect of the change in voltage of the supply circuit on the load circuit is reduced by the ferro-resonance circuit in combination with a saturated core, substantially constant voltage is not produced. In order to insure constant load circuit voltage irrespective of voltage changes on the supply circuit two compensating windings are provided. The two compensating windings which are conected in series with a resistance element across the supply circuit serve to reduce the reactance of the primary winding very much in the same manner as an increased current flow therethrough. If the supply circuit voltage increases the two compensating windings produce a flux which is superimposed on the flux of the primary winding. This superimposed flux serves to reduce the impedance or reactance of the primary winding in addition to the reactance reduction caused by increasing the current flow through the primary winding. The relatively large increase of the input voltage provides a change in the superposed flux sufficient to make the total per cent reduction in the impedance of the primary winding greater than would occur without the superimposed flux. This total per cent reduction is equal to the per cent increase of the current through the primary winding and therefore the voltage across the primary winding or the flux produced thereby is maintained substantially constant irrespective of voltage changes on the supply circuit. The purpose of the resistance in series with the compensating windings is to adjust the current flow through the compensating windings to the proper length and to provide suitable means for adding a frequency and temperature compensating circuit.

The temperature frequency compensating circuit which is connected across the compensating coils on the outside legs of the core insure constant voltage on the load circuit irrespective of frequency or temperature changes. If the frequency of the source tends to increase the impedance of the condenser in the ferro-resonance circuit will decrease with a tendency to cause an increase in the voltage on the load circuit. However, an increase in the frequency of the source also reduces the impedance of the condenser and raises the impedance of the coil in the temperature frequency compensating circuit. This will cause more leading current to be drawn through the resistance element in series with the compensating windings. Inasmuch as the compensating windings draw a lagging current it is apparent this lagging current is offset by the leading current drawn by the condenser in shunt with the inductance element connected across the compensating windings. A reduction is caused in the voltage drop across the resistance element to allow more current flow through the compensating windings. This in turn reduces the impedance of the primary winding and holds the voltage constant across the load circuit. An opposite action takes place in case the frequency of the supply circuit is reduced. Furthermore, a like operation to that explained above for frequency changes also takes place in case of temperature changes. An increase in the temperature tends to reduce the capacity of the condenser whereas a temperature decrease tends to increase the capacity of the condenser.

Figure 2:
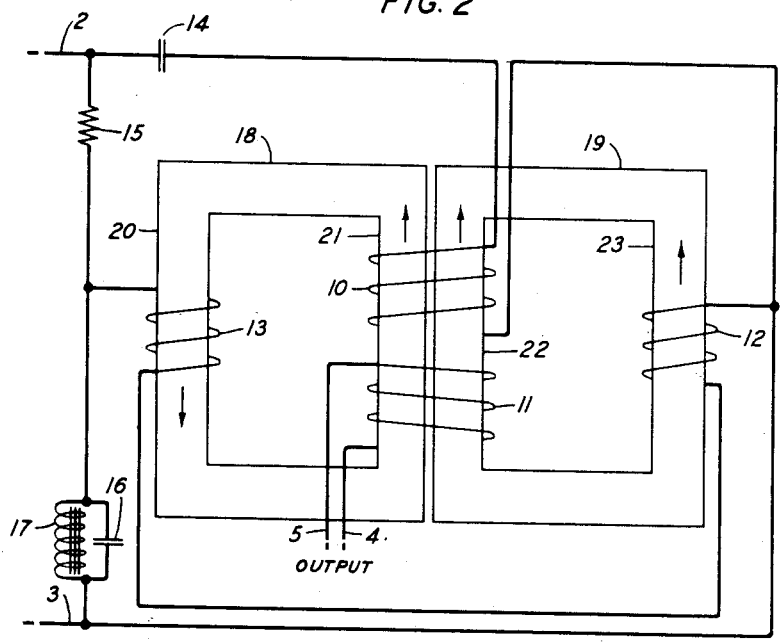

In the accompanying drawing:

Fig. 1 is a diagrammatic view of a voltage regulator constructed in accordance with the invention; and Fig. 2 is a diagrammatic view of a modification of the voltage regulator shown in Fig. 1 of the drawing.

Referring to Fig. 1 of the drawing a voltage regulator 1 is shown connected between an alternating current supply circuit comprising conductors 2 and 3 and a load circuit comprising conductors 4 and 5. The voltage regulator comprises a three-legged core 6 having a central leg 7 and two outside legs 8 and 9. A transformer comprising a primary winding 10 and a secondary winding 11 is mounted on the central leg 7 and two compensating windings 12 and 13 are respectively mounted on the outside legs 8 and 9. A ferro-resonance circuit comprising a condenser 14 and the primary winding 10 of the transformer is connected across the supply conductors 2 and 3. The ferro-resonance circuit is operated above the jumping point of its characteristic curve so that changes in voltage across the supply conductors are reduced across the primary winding of the transformer. The secondary winding 11 of the transformer is connected to the load circuit comprising conductors 4 and 5.

A compensating circuit comprising a resistance element 15 and the compensating windings 12 and 13 is connected across the supply conductors 2 and 3. The two compensating windings 12 and 13 are in series aiding relation and serve to maintain the flux of the primary winding 10 substantially constant irrespective of voltage changes across the supply conductors 2 and 3. The resistance element 15 serves to adjust the current through the windings 12 and 13 and to provide a suitable means for aiding the frequency and temperature compensating circuit which will be described later.

The voltage regulator above described will maintain substantially constant voltage on the output conductors 4 and 5 irrespective of voltage changes on the supply circuit comprising conductors 2 and 3. The flux variations by the primary winding 10 in the ferro-resonance circuit are reduced as compared to the voltage variations of the supply circuit. The reactance of condenser 14 is larger than the reactance of the primary winding 10 and the total impedance of the ferro-resonance circuit is essentially the reactance of the condenser 14 less the reactance of the primary winding 10. Furthermore, variations of flux by the primary winding are reduced as compared to voltage variations on the supply circuit by reason of a core 6 being operated above the knee of the magnetization curve.

If the voltage across the supply conductors 2 and 3 increases there will be an increased current flow through the primary winding 10 which will reduce the reactance of the primary winding and accordingly the total impedance of the ferro-resonance circuit will be increased. The total change of flux produced by the primary winding 10 will be much smaller than the variation of voltage on the supply circuit by reason of the ferro-resonance circuit which is operated above the jumping point and by reason of the core being operated above the knee of the magnetization curve. Although the ferro-resonance circuit reduces the effect on the load circuit of voltage variations on the supply circuit, it does not supply substantially constant voltage to the load circuit. The compensating windings 12 and 13 connected in series with the resistance 15 across the supply circuit control the flux in the core 6 to maintain the flux constant so that constant voltage is maintained across the secondary winding 11. The windings 12 and 13 produce flux in series aiding relation and reduce the reactance of the primary winding 10 in the same manner as an increased current flow through the primary winding. In the case under consideration the superposed flux by the windings 12 and 13 reduces the reactance of the primary winding sufficient to maintain the primary flux substantially constant. The resistance 15 may be adjusted to maintain the current flow through the windings 12 and 13 at a proper level.

If the voltage across the supply conductors 2 and 3 falls below normal value an opposite operation to that described above takes place. The reactance of the primary winding 10 is increased by reason of the decreased current flow and the impedance of the ferro-resonance circuit is decreased. Moreover, the compensating coils 12 and 13 further increase the reactance of the primary winding 10 to maintain the primary winding flux substantially constant. The condenser 16 shunted by retardation coil 17 having an iron core is connected across the compensating windings 12 and 13. The condenser 16 and the retardation coil 17 form a temperature frequency compensating circuit to maintain the output voltage from the secondary winding 11 substantially constant irrespective of frequency changes on the source or temperature changes.

If the frequency of the current supplied by the conductors 2 and 3 tends to increase then the impedance of the condenser 14 decreases. Decrease in the impedance of the condenser 14 causes an increase in the voltage output unless compensation for this change is effected. An increase in the frequency of the supply circuit also reduces the impedance of the shunt condenser 16 and increases the impedance of the shunt reactance coil 17. The change in the impedances of the condenser 16 and reactance coil 17 causes a leading current to be drawn through the temperature frequency compensating circuit. The leading current offsets the lagging current drawn through the resistance 15 to permit more current to be drawn through the compensating coils 12 and 13 to compensate for the increased voltage output which is caused by the decrease in the impedance of the condenser 14. It may be noted that the voltage drop across the resistance element 15 is reduced when the leading current in the temperature frequency compensating circuit offsets the lagging current drawn by the coils 12 and 13 to allow more current to flow through the compensating windings. More current flow through the compensating windings 12 and 13 insures reduction in the reactance of the primary winding 10 and therefore a substantially constant voltage output from the secondary winding 11.

If the frequency of the supply source decreases an opposite operation to that described above takes place. The impedance of the condenser 14 increases and accordingly unless compensation is effected the voltage output from the secondary winding 11 will be decreased. The temperature frequency compensating circuit is so affected by the reduction in the frequency of the supply circuit as to draw a lagging current. This lagging current cooperates with the lagging current drawn by the windings 12 and 13 to reduce the current flow through the compensating winding and accordingly permit a small increase in the reactance of the primary winding 10. This maintains the primary winding flux substantially constant.

Temperature changes on the regulator mainly affect the condensers. Condensers are available which increase or decrease with an increase in temperature. In describing the invention the condensers are assumed to decrease in capacity for an increase in temperature. If the temperature increases there is a decrease in the capacity of the condenser 14 in the ferro-resonance circuit to decrease the voltage output from the secondary winding 11. The capacity of the condenser 16 in the frequency temperature compensating circuit is also decreased to decrease the leading current drawn thereby and offset to a less extent the lagging current drawn by the compensating windings 12 and 13. Accordingly the voltage drop across the resistance element 15 is increased to allow less current flow through the compensating windings 12 and 13. A decreased current flow through the windings 12 and 13 raises the impedance of the primary winding 10 to counteract the effect of reduction in the capacity of condenser 14 in the ferro-resonance circuit. In this manner the primary winding flux is maintained constant to maintain a substantially constant voltage output from the secondary winding 11.

If the temperature decreases an opposite operation to that described above takes place. The operation of the temperature frequency compensating circuit when subjected to a temperature decrease is substantially the same as that described above when reference was made to a frequency decrease.

The circuits disclosed in this application also effect compensation for changes in load so that the load voltage is held constant. This feature will be explained by referring to Fig. 1 of the drawing. If a light load is placed on the regulator the impedance of the ferro-resonant circuit is essentially the reactance of the condenser 14 less the reactance of the winding 10. When the load increases an appreciable effective resistance appears across the winding 10 and there is a decrease in the effective series reactance of this winding. This, together with the appearance of an effective series resistance increases the impedance of the ferro-resonant circuit to lower the current flow therethrough. The winding 10 being operated on a core 6 around saturation it is possible to effect large change of current in the ferro-resonant circuit with small change in voltage across the winding 10 and thereby maintain substantially constant voltage on the load circuit.

Referring to Fig. 2 of the drawing, a modification of the invention is illustrated wherein the three-legged core shown in Fig. 1 of the drawing is replaced by two rectangular cores 18 and 19. Like parts to those shown in Fig. 1 of the drawing have been indicated in Fig. 2 by similar reference characters.

The core 18 shown in Fig. 2 of the drawing is provided with two legs 20 and 21 and the core 19 is provided with two legs 22 and 23. The primary winding 10 and the secondary winding 11 are mounted on the legs 21 and 22 of the cores 18 and 19. The compensating windings 13 and 12 are respectively mounted on the legs 20 and 23 of the cores 18 and 19. The cores 18 and 19 are operated above the knee of the magnetization curves therefor and the ferro-resonance circuit is operated above the jumping point. The flux produced by the winding 13 in the core 18 assists the flux produced by the winding 10 in the core 18 whereas the flux produced by the compensating winding 12 in the core 19 opposes the flux produced by the winding 10 in the core 19. The flux produced by the two compensating windings 13 and 12 provide sufficient reactance in the primary coil 10 and because of the flux directions insure against voltage transfer between the primary winding and the two compensating windings. The ferro-resonance circuit, compensating circuit and the frequency temperature compensating circuit shown in Fig. 2 of the drawing operate in exactly the same manner as like circuits shown in Fig. 1 of the drawing. Accordingly a detailed description of these circuits in Fig. 2 of the drawing is deemed unnecessary.

Modifications in the circuits and in the arrangement and location of parts may be made within the spirit and scope of the invention and such modifications are intended to be covered by the appended claims.

The subject-matter of this application is related to that of my applications Serial No. 354,998 and Serial No. 355,000, filed concurrently herewith.

What is claimed is:

1. In a voltage regulator, control means comprising a ferro-resonance circuit operating above the jumping point of its characteristic curve for connecting a supply circuit to a load circuit and for maintaining constant voltage on the load circuit irrespective of voltage changes of the supply circuit, and means for governing said control means to compensate for frequency and temperature changes.

2. In a voltage regulator, a regulator circuit comprising a capacitive element and an inductive element connected to an alternating current supply circuit, a load circuit coupled to said inductive element, and means for controlling said regulator circuit to maintain the load circuit voltage constant irrespective of voltage, frequency and temperature changes.

3. In a voltage regulator, a ferro-resonance circuit having a capacitive impedance during normal operation comprising capacity and inductive elements connected to an alternating current supply circuit, a load circuit coupled to said ferro-resonance circuit, and means for controlling said ferro-resonance circuit to maintain the load circuit voltage constant irrespective of voltage, frequency and temperature changes.

4. In a voltage regulator, a control circuit comprising a capacitive element and an inductive element forming a ferro-resonant circuit for connecting an alternating current supply circuit to a load circuit and for maintaining constant voltage on the load circuit irrespective of voltage changes on the supply circuit, said load circuit being coupled to said inductive element, and means for governing said control circuit to maintain said load voltage constant irrespective of temperature and frequency changes.

5. In a voltage regulator connected between an alternating current supply circuit and a load circuit, a ferro-resonance circuit operating above the jumping point of its characteristic curve and comprising capacity and inductance elements connected to said supply circuit, a transformer having a primary winding in said ferro-resonance circuit and a secondary winding connected to said load circuit, and means for controlling said ferro-resonance circuit to compensate for voltage, frequency and temperature changes.

6. A voltage regulator comprising a ferro-resonance circuit having a capacitive impedance during normal operation connected across a source of alternating current, said ferro-resonance circuit comprising a condenser and the primary winding of a transformer, a structure of magnetic material having said primary winding and an associated secondary winding mounted thereon, means for controlling the reactance of said primary winding in said structure to maintain constant secondary voltage irrespective of load and voltage changes, and means for controlling the reactance of said primary winding to compensate for frequency and temperature changes.

7. A voltage regulator comprising a three-legged core, a transformer having a primary winding and a secondary winding mounted on one leg of said core, a ferro-resonance circuit connected to an alternating current source and comprising a condenser and said primary winding, and two compensating windings energized from said source and respectively mounted on two legs of said core in series aiding relation.

8. In a voltage regulator, a ferro-resonance circuit connected across a source and comprising a condenser and the primary winding of a transformer, a secondary winding of said transformer connected to a load circuit, a three-legged core having the primary and secondary windings mounted on one leg thereof, and two compensating windings energized by said source and respectively mounted on the other two legs of said core.

9. In a voltage regulator connected between an alternating current supply circuit and a load circuit, a three-legged core having a primary winding and a secondary winding mounted on one leg and two compensating windings respectively mounted on the other two legs, a condenser connected to the supply circuit in series with said primary winding to form a ferro-resonance circuit, said compensating windings being connected to the supply circuit in series with a resistance element with the flux produced by the windings in series aiding relation, and a condenser in parallel with an inductance element connected across said compensating windings.

10. A voltage regulator comprising a three-legged core, a transformer having a primary winding and secondary winding mounted on the central leg of said core, a ferro-resonance circuit connected to an alternating current source and comprising said primary winding and a condenser, two compensating windings energized from said source and respectively mounted on the two outside legs of said core in series aiding relation, and a condenser and an inductance element in parallel relation connected across said compensating coils to compensate the regulating operation for temperature and frequency changes.

11. In a voltage regulator, a ferro resonance circuit connected across a source and comprising a condenser and the primary winding of a transformer, a secondary winding for said transformer connected to a load circuit, a three-legged core having said primary and secondary windings mounted on the central leg of said core, two compensating windings energized by said source and respectively mounted on the two outside legs of said core, and means for controlling said compensating windings to compensate for temperature and frequency changes.

12. In a voltage regulator connected between an alternating current supply circuit and a load circuit, a saturated three-legged core having a primary winding and a secondary winding mounted on the central leg and two compensating windings respectively mounted on the two outside legs, a condenser connected to the supply circuit in series with said primary winding to form a ferro-resonance circuit, said ferro-resonance circuit operating above the jumping point thereof and said compensating windings being connected to said source with the flux produced by the windings in series aiding relation, and a condenser in parallel with an inductance element connected across said compensating windings to compensate for frequency and temperature changes.

13. A voltage regulator adapted to be connected to a source of alternating current for maintaining substantially constant a voltage across a load, comprising a core of magnetic material, a plurality of windings on said core, a ferro-resonant circuit having a normally capacitive impedance connected to said source of alternating current and comprising one of said plurality of windings and a condenser, a load circuit comprising one of said plurality of windings, and means for preventing voltage changes across said load due to frequency variations of said source.

14. A voltage regulator adapted to be connected to a source of alternating current for maintaining substantially constant voltage across a load, comprising a core of magnetic material, a plurality of windings on said core, a ferro-resonant circuit having a normally capacitive impedance connected to said source of alternating current and comprising one of said plurality of windings and a condenser, a load circuit comprising one of said plurality of windings, and means for preventing voltage changes across said load due to frequency variations of said source, said means comprising a circuit having inductance and capacitance connected to one of said plurality of windings.

15. In a voltage regulator, control means for connecting a supply circuit to a load for preventing the occurrence of substantial changes in voltage across the load due to supply voltage changes, said means comprising a ferro-resonant circuit operating above the jumping point of its characteristic curve, and means functioning independently of said load voltage for preventing substantial voltage changes across the load which would occur due to frequency changes of the current in said supply circuit if said last-mentioned means were not provided.

16. Means operating independently of the voltage across a load for connecting a current supply circuit to said load to maintain the voltage across the load substantially constant, said means comprising a ferro-resonant circuit the impedance of which is capacitive during operation, and means for preventing substantial voltage changes across the load which would occur due to frequency changes of the current in said supply circuit if said last-mentioned means were not provided.

17. A voltage regulator connected between a source of alternating current and a load for maintaining the load voltage substantially constant irrespective of voltage and frequency changes of said source, a series circuit connected to said source comprising in series with said source a condenser and a first winding having a magnetic core structure, said load receiving energy from said winding and said series circuit having the property of causing the voltage supplied to said load by said winding to change less with change in voltage of said source than it would if said load were directly connected to said source, a circuit in shunt to said series circuit with respect to said source having therein a second winding on said core structure for utilizing a change in voltage of said source to control the flux in said core structure in a manner to further reduce change of voltage supplied to said load by said first winding with voltage changes of said source, the reactance of said series and shunt circuit arrangements being sensitive to change of frequency of said source to cause a resulting change of voltage supplied to said load, said two windings setting up opposing fluxes in said core structure, and reactive means associated with said circuits to increase the current through said shunt circuit when the current through said series circuit increases due to change of frequency of said source in one direction and to decrease the current through said shunt circuit when the current through said series circuit decreases due to change in frequency of said source in the opposite direction, thereby substantially preventing load voltage changes due to frequency changes of said source.

18. A voltage regulator connected between a source of alternating current and a load for maintaining the load voltage substantially constant irrespective of voltage and frequency changes of the alternating current source, comprising a magnetic core structure having a plurality of windings thereon, a ferro-resonant circuit comprising a first winding and a condenser connected in series to said alternating current source, a load circuit receiving energy from one of said plurality of windings, the inductive reactance being less than the capacitive reactance of said ferro-resonant circuit and said inductive reactance decreasing in response to current increase in said ferro-resonant circuit caused by a voltage increase of said source and vice versa, to cause the total impedance of said ferro-resonant circuit to change in a manner to minimize current change in said ferro-resonant circuit in response to voltage change of said source, a resistor and a second of said plurality of windings connected in series with each other to said source of alternating current for setting up in said core a magnetomotive force less than and opposing the magnetomotive force set up by said first winding in a portion of said core on which is wound the winding which supplies energy to said load circuit for reducing or eliminating voltage changes across said load due to current changes in said first winding caused by voltage changes of said source, and a circuit comprising a condenser and an inductance connected in parallel with each other tuned to the normal frequency of said current source, said circuit being connected in parallel with said second winding, leading current flowing through said circuit when the frequency is above normal to reduce the voltage drop across said resistor and thus increase the current in said second winding and increase the magnetomotive force due to said second winding, thereby reducing or eliminating the increase in flux due to the increased current in said first winding caused by the increased frequency of said source, lagging current flowing through said circuit when the frequency is below normal to increase the voltage drop across said resistor and thus reduce the current in said second winding and reduce the magnetomotive force due to said second winding, thereby reducing or eliminating the decrease in flux due to decreased current in said first winding caused by the decreased frequency of said source.

19. In a voltage regulator connected between an alternating current supply circuit and a load circuit, a series ferro-resonance circuit connected to said supply circuit, a transformer having a first winding in the ferro-resonance circuit, a load circuit connected to said transformer, said ferro-resonance circuit being operated above the jumping point of the characteristic curve, control means operated according to variations in the supply circuit voltage for opposing the flux due to said first winding by a flux of less value but which varies at a greater rate, means for substantially preventing the introduction of an electromotive force in said ferro-resonance circuit by said control means, and means for governing said control means to compensate for frequency variations of the supply circuit and temperature variations.

20. Means for supplying substantially constant voltage to a load irrespective of voltage changes of a source of alternating current for supplying current to the load and of temperature changes, comprising means having reactance through which current from said source flows for energizing said load and for maintaining the load voltage substantially constant irrespective of voltage changes of said source, the reactance of said means varying with changes in temperature to cause a resulting change in voltage across said load, and additional means having reactance which varies with temperature through which current from said source flows for preventing changes in voltage across the load due to temperature changes.

21. Means for supplying substantially constant voltage to a load irrespective of voltage changes of a source of alternating current for supplying current to the load and of temperature changes, comprising means for maintaining the load voltage substantially constant irrespective of voltage changes of said source including a ferro-resonant circuit having a normally capacitive impedance through which current from said source flows for energizing said load, the reactance of said ferro-resonant circuit changing with temperature changes to cause a resulting change in voltage across said load, and additional means having reactance which varies with temperature through which current from said source flows for preventing changes in voltage across the load due to temperature changes.

22. A voltage regulator connected between a source of alternating current and a load for maintaining the load voltage substantially constant irrespective of voltage changes of said source and temperature changes, comprising a series circuit connected to said source comprising in series with said source a condenser and a first winding having a magnetic core structure, said load receiving energy from said winding and said series circuit having the property of causing the voltage supplied to said load to change less with change in voltage of said source than it would if said load were directly connected to said source, a circuit in shunt to said series circuit with respect to said source having therein a second winding on said core structure for utilizing a change in voltage of said source to control the flux in said core structure in a manner to further reduce change of voltage supplied to said load by said first winding with voltage changes of said source, said two windings setting up opposing fluxes in said core, the reactance of said series circuit being sensitive to change of temperature to cause a resulting change of voltage supplied to said load, and reactive means associated with said circuits to increase the current through said shunt circuit when the current through said series circuit increases due to temperature change in one direction and to decrease the current through said shunt circuit when the current through said series circuit decreases due to temperature change in the opposite direction, said reactive means comprising a condenser and an inductance connected in parallel and tuned to the normal frequency of said current source.

23. In a voltage regulator connected between an alternating current supply circuit and a load circuit, a three-legged core, a transformer having at least one primary winding and a secondary winding, a compensating winding, all of said windings being mounted on at least two legs of said core, a series ferro-resonance circuit connected across said supply circuit and comprising a condenser and said primary winding, a compensating circuit comprising a resistance element and said compensating winding connected across said circuit for producing a flux opposing the flux of said primary winding to maintain constant voltage across said secondary winding irrespective of voltage changes on the supply circuit and load changes, and a temperature frequency compensating circuit for governing said compensating circuit to maintain the voltage across the secondary winding constant irrespective of frequency and temperature changes.

24. A voltage regulator adapted to be connected to an alternating current supply circuit for maintaining substantially constant voltage across a load during normal operation comprising a core structure having three legs of magnetic material, a plurality of windings on said core, a ferro-resonant circuit the impedance of which is capacitive during normal operation connected across said supply circuit and comprising a condenser and a first of said plurality of windings on one of the legs of said core for producing a flux in each of the outer legs of said core, a second of said plurality of windings being in a circuit connected across said supply circuit and producing a flux opposing the flux due to said first winding in one of the outer legs and a flux aiding the flux due to the first winding in the second outer leg, an output circuit, one of said plurality of windings being in said output circuit and on that leg of said core on which is mounted the winding which is in said ferro-resonant circuit, and means for preventing voltage changes across said load due to frequency changes of said source, said means comprising a circuit the impedance of which varies in response to frequency variations.

BRUCE E. STEVENS.